US006963885B2

(12) United States Patent
Calkins et al.

(10) Patent No.: US 6,963,885 B2
(45) Date of Patent: Nov. 8, 2005

(54) SYSTEM AND METHOD FOR IDENTIFYING INVOICES THAT MAY BE DUPLICATE PRIOR TO PAYMENT

(75) Inventors: W. Dwight Calkins, Dalas, TX (US); Ruth A. Donnelly, New Milford, PA (US); Julie M. Murphy, Vestal, NY (US); Joseph W. Vanlone, Hartsville, SC (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 09/832,572

(22) Filed: Apr. 11, 2001

(65) Prior Publication Data

US 2002/0194174 A1 Dec. 19, 2002

(51) Int. Cl.$^7$ ............................................. G06F 17/30
(52) U.S. Cl. ............................. 707/202; 707/3; 707/4
(58) Field of Search ............................... 707/3, 4, 203, 707/33, 34

(56) References Cited

U.S. PATENT DOCUMENTS

| 5,111,395 | A | | 5/1992 | Smith et al. ................... 705/45 |
| 5,357,629 | A | | 10/1994 | Dinnis et al. ................ 395/600 |
| 5,497,486 | A | * | 3/1996 | Stolfo et al. .................... 707/7 |
| 5,550,734 | A | | 8/1996 | Tarter et al. ............. 364/401 R |
| 5,675,780 | A | | 10/1997 | Plant-Mason et al. ......... 707/6 |
| 5,680,611 | A | * | 10/1997 | Rail et al. .................... 707/101 |
| 5,717,915 | A | * | 2/1998 | Stolfo et al. .................... 707/5 |
| 5,806,057 | A | * | 9/1998 | Gormley et al. ................ 707/1 |
| 5,845,285 | A | | 12/1998 | Klein ........................... 707/101 |
| 5,930,778 | A | | 7/1999 | Geer ............................ 705/45 |
| 6,035,295 | A | | 3/2000 | Klein ............................. 707/6 |
| 6,418,467 | B1 | * | 7/2002 | Schweitzer et al. ......... 709/223 |
| 2003/0212617 | A1 | * | 11/2003 | Stone et al. .................. 705/30 |

OTHER PUBLICATIONS

Dina et al. Duplicate record elimination in large data files (ACM transactions on Database System (TODS), ACM Press, volum 8, Issue 2, Year 1983, pp. 255–265.*

Amy et al. Duplicate detection using k–way sorting method (Symposium on Applied Computing), ACM Pres, Year 2000, pp. 323–327.*

Hewlett–Packard Co. "MCBA Accounts Payable System— HP–UX Documentation Disk HP LaserROM Part No. 50726–10186", *Software Patent Institute Database of Software Technologies*, S/N HPAPPS.0149, (c) 1981–1993 by HP Corp., Feb. 1, 1995.

M. W. Beach, et al. "Preprocessor System and Method for Rejection of Duplicate Invoices", U.S. Appl. No. 09/244, 304 filed Feb. 3, 1999.

* cited by examiner

*Primary Examiner*—Jean M. Corrielus
*Assistant Examiner*—Baoquoc N. To
(74) *Attorney, Agent, or Firm*—Shelley M. Beckstrand; William E. Schiesser

(57) ABSTRACT

A system and method for identifying duplicate invoices among multiple systems, the method including the steps of loading first invoices having an index number into a database during a first predetermined time period; for each invoice having said index number, searching the database for another invoice, loaded during a second earlier time period, having the same index number and replacing the another invoice, if found, with said first invoice; comparing each first invoice for which no matching index number invoice was found with all other first invoices for which no matching index number invoice was found; comparing each of the first invoices for which no matching index number invoice was found with all the other invoices including the replaced invoices in the database; generating reports of the comparing steps, the reports listing invoices which compared; and eliminating from the database the first invoices deemed to have compared.

34 Claims, 5 Drawing Sheets

| | |
|---|---|
| DUPREP: | GENERATE RECONCILIATION REPORTS FOR DUPLICATE INVOICE PAYMENT SYSTEM. |
| DUPSTART: | DO INITIAL LOAD FOR DUPLICATE PAYMENT INVOICE DETECTION FILE. |
| DUPPAY: | MAINTAIN DUPLICATE INVOICE DETECTION FILE SAS DATA BASE. |
| DUP1: | CAPTURE PACKETS HAVING SAME VENDOR AND INVOICE NUMBERS. |
| DUP2: | CAPTURE PACKETS HAVING SIMILAR VENDOR NAMES AND SAME INVOICE AMOUNT. |
| DUP3: | CAPTURE PACKETS HAVING SIMILAR INVOICE DATES AND AMOUNTS, DIFFERING ONLY ON FLAGGED CONDITIONS. |
| DUP4: | CAPTURE PACKETS HAVING SAME INVOICE AMOUNT AND NUMBERS BUT NOT SAME DATE AND VENDOR NAME. |
| DUP5: | CAPTURE PACKETS HAVING SAME INVOICE NUMBER AND VENDOR NAME BUT NOT SAME VENDOR NUMBER AND INVOICE AMOUNT. |
| DUP6: | CAPTURE PACKETS HAVING SAME VENDOR NUMBER AND SAME INVOICE NUMBER AND AMOUNT, IRRESPECTIVE OF INVOICE DATE. |

FIG. 3

DUPLICATE REPORT MATRIX

| REPORT | CLIP LEVEL | VEN_NAM | VEN_NUM | INV_NUM | INV_DT | INV_AMT | FLAGS 1 | 2 | 3 | 4 | 5 | 6 |
|---|---|---|---|---|---|---|---|---|---|---|---|---|
| dup1 | O |   | X | X | O | O |   |   |   |   |   |   |
| dup2 | 100 | X |   |   | O | X |   | ✶ |   |   |   |   |
| dup3 | O |   |   |   | X | X | ✶ | ✶ | ✶ | ✶ | ✶ | ✶ |
| dup4 | O | O | O | X | O | X |   |   |   |   |   |   |
| dup5 | O | X | O | X |   | O |   |   |   |   |   |   |
| dup6 | O |   | X | X | O | X |   |   |   |   |   |   |

X     COMPARES EQUAL

O     COMPARES NOT EQUAL

✶     DROPPED IF NOT APPLICABLE

FIG. 5

SYSTEM AND METHOD FOR IDENTIFYING INVOICES THAT MAY BE DUPLICATE PRIOR TO PAYMENT

BACKGROUND OF THE INVENTION

1. Technical Field of the Invention

This invention pertains to processing of invoices for payment. More particularly, it relates to identifying and taking action on duplicate invoices prior to payment.

2. Background Art

Currently, electronic payment, or enterprise resource planning (ERP), systems have some sort of duplicate check which are limited in scope to a single, native system and to check criteria. There are also companies that specialize in running similar programs and collecting duplicate payments made. There is a need in the art for an improved system and method for comparing activity from multiple systems to identify duplicate invoices prior to payment. This improved system should initiate the detection of duplicate invoices before payment and thus avoid considerable expense. Typically there are four successively more expensive alternative outcomes of a duplicate payment after the check has been sent. They are: (1) the check can be returned with a subsequent administrative cost in voiding the transaction; (2) the check can be retained and cashed and a more expensive collection process invoked based on discovery later via an in-house post payment system; (3) an outside audit firm can discover the duplicate invoice which incurs the preceding expense plus a finders fee to the firm; and (4) the duplicate payment can be lost in its entirety.

In some, particularly large, enterprises, multiple accounts payable (A/P) systems may be consolidated at a headquarters level. As a result, the purchasing function of the enterprise may purchase goods on different systems from the same vendor. Therefore it is possible, and occasionally occurs, that the same invoice is submitted for payment to more than one system. There is a need in the art to detect such duplicate invoices.

It is an object of the invention to provide and improved method and system for identifying duplicate invoices prior to payment.

It is a further object of the invention to provide a system and method for identifying prior to payment duplicate invoices from activity on multiple systems.

It is a further object of the invention to provide a system and method periodically executing a plurality of coordinated logic processes comparing current activity against historical activity from a plurality of systems for identifying duplicate invoices prior to payment.

SUMMARY OF THE INVENTION

A system and method for capturing packets of possible duplicate invoices for duplicate invoice analysis, the method comprising the steps of maintaining a collection of current invoices that have not yet been paid; maintaining a collection of history invoices that have been paid; and generating from the current invoices and history invoices a packet of invoices exhibiting a same behavior, the packet including at least one invoice from said collection of current invoices.

A system and method for identifying duplicate invoices among multiple systems, the method including the steps of loading first invoices having an index number into a database during a first predetermined time period; for each invoice having said index number, searching said database for another invoice, loaded during a second earlier time period, having the same index number and replacing said another invoice, if found, with said first invoice; comparing each first invoice for which no matching index number invoice was found with all other first invoices for which no matching index number invoice was found; comparing each of said first invoices for which no matching index number invoice was found with all the other invoices including the replaced invoices in said database; generating reports of the comparing steps, the reports listing invoices which compared; and eliminating from said database said first invoices deemed to have compared.

In accordance with an aspect of the invention, there is provided a computer program product configured to be operable to identify duplicate invoices among multiple systems.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a chart illustrating the code modules implementing a preferred embodiment of the invention.

FIG. 5 is a diagram illustrating the duplicate report matrix of an exemplary embodiment of the invention.

BEST MODE FOR CARRYING OUT THE INVENTION

Figure 1:
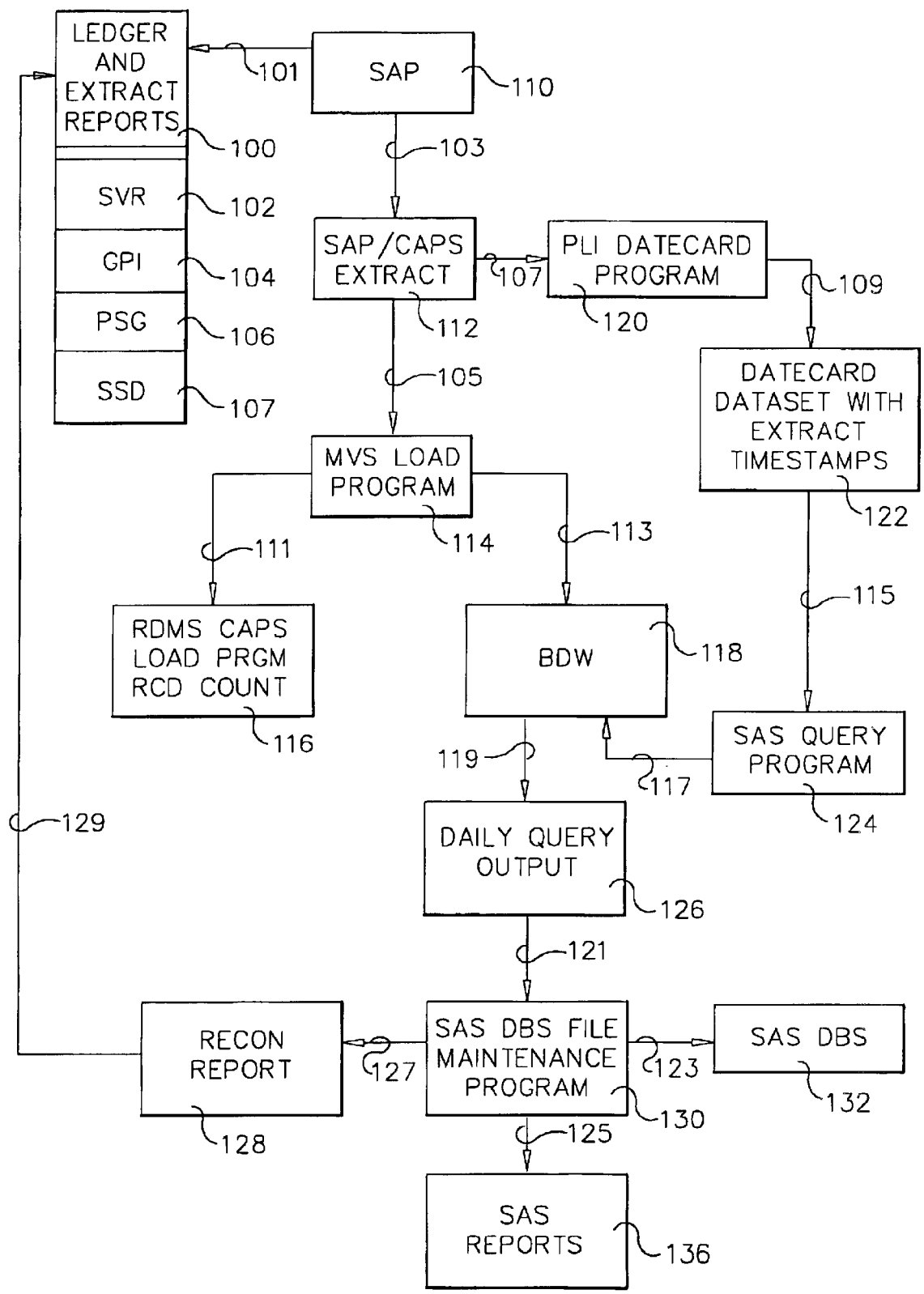
FIG. 1 is a system diagram illustrating the various components of the system of the invention.

Referring to FIG. 1, the duplicate invoice system of the preferred embodiment of the invention includes the following component parts: ledger and extract reports 100, including those for several divisions, groups, and corporate entities of an exemplary enterprise; these are Server Division (SVR) 102, General Procurement Invoicing (invoice entry program) (GPI) 104, Personal Services Group (PSG) 106, Storage Systems Division (SSD) 107; Systems, Applications, Products in Data Processing (SAP) 110, SAP Common Accounts Payable System (SAP/CAPS) 112, MVS load program 114, relational database management system (RDMS) CAPS load program record count 116, Business Data Warehouse (BDW) 118, PL1 datecard program with extract timestamps 122, SAS query program 124, daily query output 126, SAS database (DBS) file maintenance program 130, SAS DBS 132, SAS reports 136, and RECON report 128.

Reports 100 are control reports that get generated as the result of the daily jobs finishing SAP 110. Each SAP instance (SVR, GP1, PSG, SSD, etc.) closes out its daily function and creates an extract control report 102, 104, 106, 107, respectively. This report is used in the reconciliation to BDW 113. The same control report is used to reconcile what's in SAS DBS 132.

Each SAP instance processes as follows, using GP1 as an example. GP1 closes out its daily activity. The ledger runs successfully, generating the control report 104. As a result of ledger's successful completion, the extract of that data is sent, via flat file format, to the system support data center 112. These flat files contain both header and trailer records for use by MVS load program 114 and PL1 datecard program 120. MVS load program 114 loads the GP1 flat file into BDW 118, while counting all of the records and adding all of the amounts to compare against the header and trailer records. If there isn't any variance, BDW 118 is loaded and the MVS load program 114 will then output the RDMS CAPS reports 116. RDMS reports are available for all data that is loaded into BDW 118. At this point, all of the daily data is found in BDW 118. After all data from all regions has been loaded into BDW 118, the PL1 datecard program 120 starts by looking in all of the flat files that were sent from the various systems and grabs the extract time stamp off of the header record, and places it in the datacard dataset 122. With the datacard 122 being complete, the SAS query program 124 runs. It uses the datacard dataset 122 to apply the applicable extract timestamp to the query for each region. This is the way in which the application can recognize the "new or changed" records in BDW 118. The object here is to re-extract all of the new or changed records to update the SAS DBS 132. Or more simply, capture all of the records that the source systems and sent to BDW 118. Once the SAS query program 124 completes, it will then run the query, emptying the results into another flat file daily query output 126. Thereupon SAS DBS file maintenance program 130 starts. First it cleanses the database of all records having a pay date of 18 months or more. Second, it takes the data from daily query output 126 and identifies certain things, like datelike. Third, it counts all of the records that it has added, whether they are new or not. These are the records that are deemed current. This is important as the SAS reports 136 only look for matches when at least one record is current. At this point, the SAS DBS 132 has been updated and is current. Recon Report 128 runs next, looking at the SAS DBS 132, counting and adding the records that have just been added, that were there, and also records that have been deleted. This will be used by the duplicate invoice processing team to reconfirm with reports 100, 102, 104, 106 and 107 as a control. Finally, as will be described hereafter in connection with FIG. 3, the six SAS reports programs 136 run, including Dup1 186, Dup2 188, Dup3 190, Dup4 192, Dup5 194, and Dup6 196.

By way of recapitulation, SAP 110 takes a query and modifies it by inputting the correct date in order to retrieve all of the "net change" records. This is an important part of the control process hereafter described, and enables the SAS database 132 to mirror the production BDW 118 in regards to records and dollar amounts.

SAS query program 124 builds a BDW query dynamically that is date dependent. This query is passed to BDW 118.

SAS DBS file maintenance program 130 resets the prior current invoices to history and loads the newest batch of current invoices.

Recon report 128 ties the summary totals back to other systems for audit and reconciliation purposes.

SAS reports 136 are six reports that provide an expert system type analysis of the invoice file and applies different logic as documented in FIG. 3.

In accordance with the preferred embodiment of the invention, a method and system is provided for providing data that can be used to evaluate two or more invoiced documents for further investigation of possible duplicate invoicing. Further, a compact database is maintained by removing canceled invoicing and invoicing older than some predetermined period, such as 18 months. In accordance with this method, data is extracted from a database by a compare routine which matches on suppliers invoice, name, date and amount to produce a report that can be used for further investigation of duplicate invoicing.

In accordance with the system and method of the preferred embodiment of the invention, the invoice data being examined for duplicate invoices includes all invoices recently processed through the system. Since, typically, almost all of the transactions are first entered onto the system, then paid at a later date, the system captures payment before it leaves the company.

Figure 2:
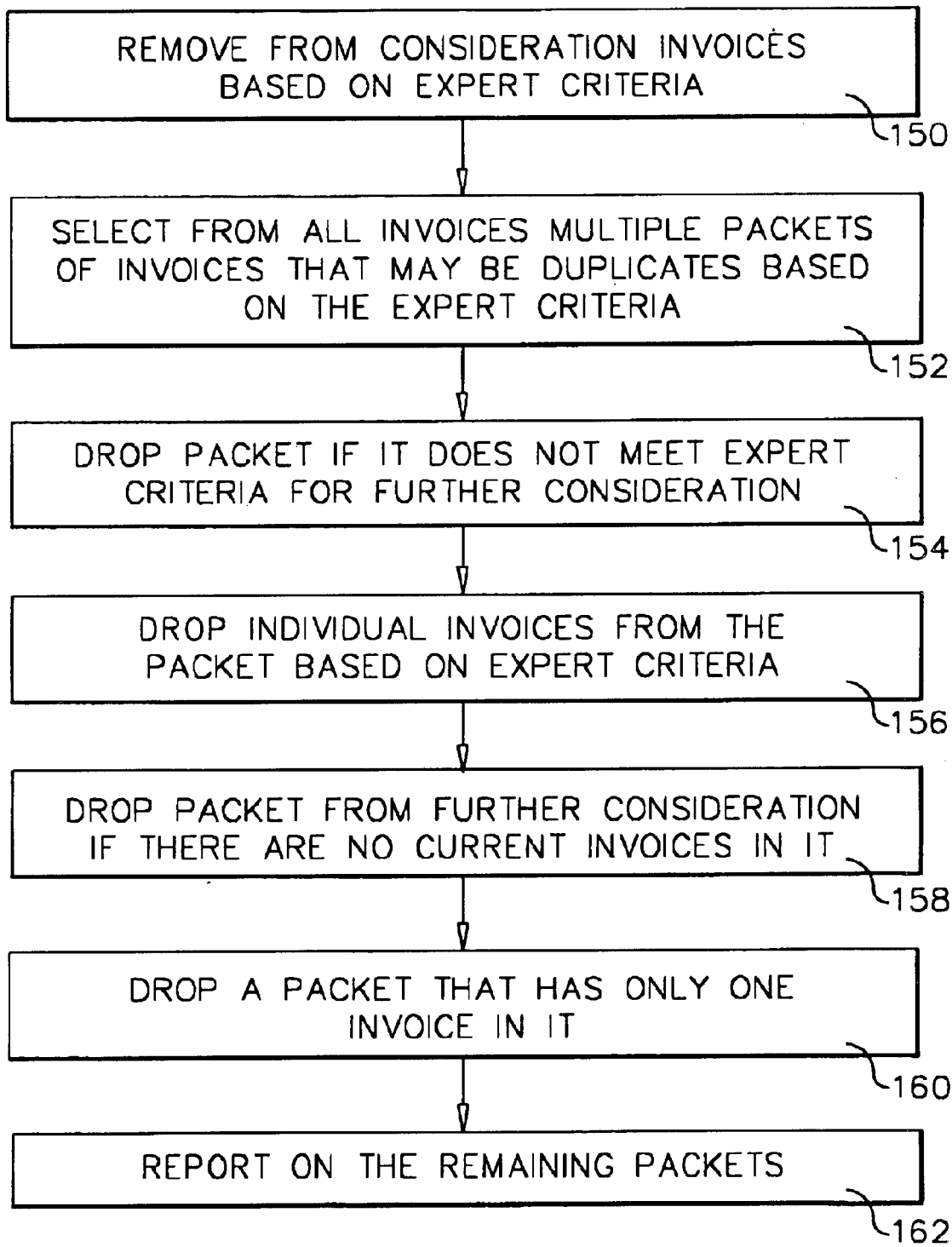
FIG. 2 is a flow chart illustrating the method steps of the preferred embodiment of the invention.

Referring to FIG. 2, in accordance with the method of the preferred embodiment of the invention, in step 150 invoices are removed from consideration based upon an expert criteria. The expert criteria may be a rule such as: "Remove the invoices whose invoice date is more than 18 months old." The set of invoices from which selected invoices are removed in step 150 (to form the set "all remaining invoices" referred to in step 152) includes all invoices from all systems, including historical and current invoices.

A packet is a collection of invoices that exhibit the same behavior. A simple packet example may be described by "select for an investigative packet those invoices which have common invoice dates and invoice amounts". A packet must also have at least one invoice that is current. A current invoice is an invoice from the previous processing period (that has not yet been paid) as distinguished from history invoices (which have been paid). A packet may have both multiple invoices from the current invoices and from the history invoices.

Figure 4:
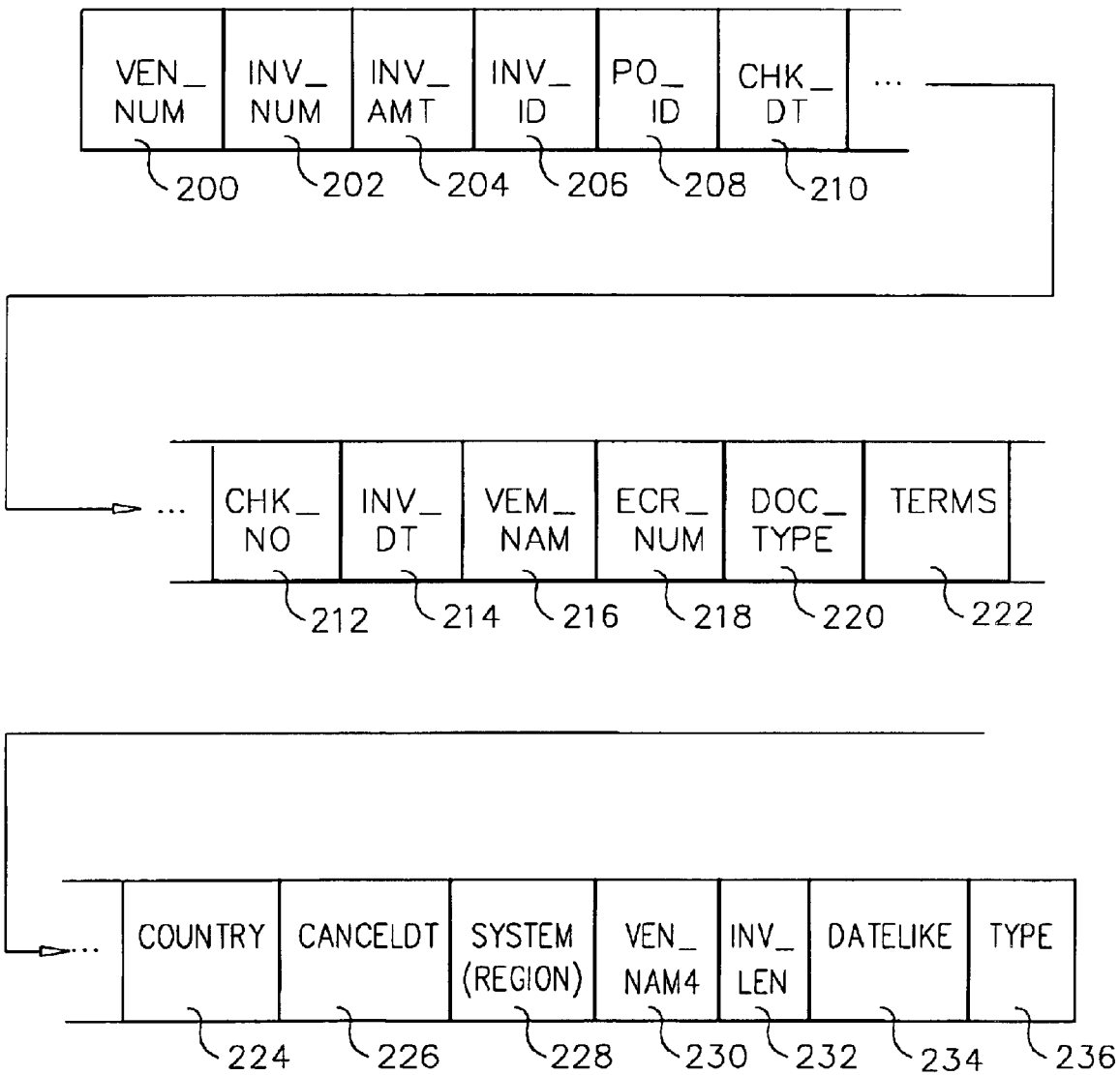
FIG. 4 is a diagram illustrating the format of a typical invoice record.

The relevant contents of a possible packet are documented in FIG. 4. Examples of two packets based on the above selection criteria are set forth in Table 1.

TABLE 1

Packet Examples

|  | Inv_Amt | Inv_Dat | Ven_Nam | Type |
|---|---|---|---|---|
| Packet #12304 | 123.99 | 01/14/2001 | Able Co. | C |
|  | 123.99 | 01/14/2001 | Able Co. | H |
|  | 123.99 | 01/14/2001 | Able Inc. | H |
|  | 123.99 | 01/14/2001 | Bondo Div | H |
| Packet #12305 | 25.00 | 09/12/2000 | Chip Inc. | C |
|  | 25.00 | 09/12/200 | Chip Co. | H |

Fields that are critical to the inquiry, with the exception of the VenNam, field are displayed in Table 1. The analyst investigating these packets will use the additional information and other resources to ascertain if the invoice set does indeed contain duplicates.

In step 152, multiple packets of invoices which may be duplicates are selected from all remaining invoices based on expert criteria. This criteria may be a set of rules, such as: select to a packet all invoices for the same dollar amount that are paid to the same vendor where the vendor name is compared for only the first four characters. The same criteria generates all the packets for a particular report 136.

In step 154, packets which do not meet expert criteria are dropped from further consideration. This criteria may be another set of rules, such as: drop the packet if it does not have date-like invoice numbers (e.g., 102098) in at least some of the invoices in it.

In step 156, individual invoices are dropped from packets based on expert criteria. Step 156 flags the invoices in a packet against each other. For example, if a transposition of two digits would cause two invoice numbers to be identical, then a flag would be set for each of these two invoices in the packet. After all of the criteria have been applied to all of the possible invoice combinations, the packet is then pruned by dropping those invoices for which no flags were set. These packets typically have a large number of candidate invoices and exclusion based on the flags reduces the packets to manageable sizes. These flags are criteria, such as:

Flag 1 Transposed digits in invoice number 202. Example, 123456 vs. 123546.

Flag 2 Date like invoice number 202 for same four character vendor name 216, with each invoice being scored for this. Example, 19980311 as entry.

Flag 3 Match on invoice number 202. Example, 123456 vs. 123456.

Flag 4 Match on invoice number 202, except for a prefix or suffix character for same four character vendor name 216. Examples, 123456A vs. 123456, or R123456 vs 123456.

Flag 5 Lengths of invoice numbers 202 differ for same four character vendor name 216. Example, 123456 vs 9123456.

Flag 6 Match on invoice numbers 202 while ignoring embedded blanks. Example, "ABC DEF" vs "ABCDEF".

In step 158, packets which contain no current invoices are dropped from further consideration. Current invoices are those which are under investigation, and history invoices are those which have been previously received. Step 150 removed invoices from the entire invoice file based on general global criteria (such as, invoices for $0.01.) This step 158 removes packets if there is no current invoices in it. Each packet is typically a small subset of the entire invoice file. In accordance with an alternative embodiment of the invention, all invoices are forced to be current. This results in all possible duplicates throughout the history being reported on. This would be done each month or quarter, generally not on a daily basis, as the resulting reports would be large. Similarly, all data is considered "new" or "current" when the system generated invoice number is not found in the SAS database 132.

In step 160, packets containing less than two remaining invoices are dropped.

In step 162, all remaining packets are reported.

Production data warehouse BDW 118 contains data from several different systems associated with reports 100, such as the SAS systems GPI 104, SVR 102, SSD 107 and legacy systems PSG 106, etc. Each systems' data is extracted and loaded into the BDW 118 at different times. Thus, the SAS generated query 117 is dynamically generated for each system, as the date and time stamp will be different.

In an exemplary embodiment of the invention, each report program DUP1, 2, 3, 4, 5, 6 goes through all of the steps 150–162 shown in FIG. 2, and executes in SAS reports 136. DUPREP 180 executes in RECON REPORT 128, and DUPPAY 184 executes in maintenance program 130.

Referring to FIG. 3, a preferred embodiment of the invention includes program code duprep 180, dupstart 182, duppay 184, dup1 186, dup2 188, dup3 190, dup4 192, dup5 194, and dup6 196.

In overview, the programming code of FIG. 3 executes a method for identifying duplicate invoices among multiple systems according to the following steps: (1) loading first invoices having an index number into a database during a first predetermined time period; (2) for each invoice having said index number, searching said database for another invoice, loaded during a second earlier time period, having the same index number and replacing said another invoice, if found, with said first invoice; (3) comparing each first invoice for which no matching index number invoice was found with all other first invoices for which no matching index number invoice was found; (4) comparing each of said first invoices for which no matching index number invoice was found with all the other invoices including the replaced invoices in said database; (5) generating reports of the comparing steps, the reports listing invoices which compared; and (6) eliminating from said database said first invoices deemed to have compared.

Dup1 186 captures packets having the same vendor and invoice numbers. For example, it captures packets for duplicate invoice analysis where the invoice was received for payment or, alternatively, paid last night (by "blast night" is meant last night or some similar immediately preceding period of time.) Each packet contains invoices having identical vendor numbers and identical invoice numbers when compared to invoices from the last night or the history file.

This analysis is done prior to payment, and is an important part of the cost avoidance. All data is pulled into SAS database 132 when it first appears in BDW 118. This could mean that a record could show up as new AND paid (emergency payments), but this application will still consider it as new. Again, almost all (say, 99%) invoice transactions are entered several days before a payment will be generated, and this allows the process to effectively locate possible duplicate invoices prior to payment.

Expert criteria, as used herein, includes the application of duplicate payment analyst's knowledge to add various rules that reduce the volume of invoices considered and enhance the probability for discovery of duplication for the remaining invoices. These criteria are generally system dependent. For example, if (DOC_TYPE='K' and ECR_NUM not='OD') then delete these invoices. However, they may be generally applicable. Example, delete invoices that are $0.00 or $0.01). The rules may be applied at the global level across all invoices or at the packet level to cull out invoices from a particular packet.

Input to dup1 186 includes files of current and historical invoices from one or a plurality systems. Referring to FIG. 4, each invoice may include fields for identifying vendor number VEN_NUM 200, invoice number INV_NUM 202, invoice amount INV_AMT 204, invoice identifier INV_ID 206, purchase order number PO_ID 208, check date CHK_DT 210, check number CHK_NO 212, invoice date INV_DT 214, vendor name VEN_NAM 216, electronic check request number (ECR#) ECR_NUM 218, document TYPE 220, terms TERMS 222, and TYPE 236.

DOC_TYP 220 is a field set by SAP 110 to contain a unique number sequentially assigned to invoices as they are processed.

TYPE 236 is a field set by SAS 130 to distinguish current invoices from history invoices; for example, to contain H for invoices already processed in a previous time period, and C for invoices processed in the current (or immediately preceding) time period, typically the day before preparation of this report.

In accordance with an exemplary embodiment, dup1 186 executes the following steps:

1. Deleting invoices from consideration if
   Type is 'K' and ECR_NUM is not 'OD', or
   Type is 'RS'
2. Sorting invoices in a packet by VEN_NUM, INV_NUM AND INV_AMT.
3. Flushing packets containing only one invoice.
4. Marking packets that have different invoice dates or amounts with reference to the first check (that is, first invoice) in the packet.

5. Reporting last payments compared to payment history for a two point match on vendor number and invoice number when the invoice date or invoice amount are different.

Dup2 188 captures packets having similar vendor names and the same invoice amount. For example, it captures packets for duplicate invoice analysis where the invoice was paid last night and that have identical vendor names (first N, such as four, characters only) and identical invoice amounts when compared to invoices from the last night or the history file. Packets are dropped where the invoice date is different, and invoices are dropped for which the invoice number is not datelike. The invoice number field defaults to the date the ECR was entered when the submitter does not enter an invoice number. Dup2 contains logic to bring in most of the duplicates between ECR to ECR activity.

In accordance with an exemplary embodiment, Dup2 188 executes the following steps:

1. Dropping invoices older than, say, nine months.
2. Deleting invoices from consideration if
   Type is 'K' and ECR_NUM is not 'OD', or
   Type is 'RS'
3. Capturing packets that have a check from last night and have identical vendor names and invoice amounts.
4. Marking packets that have different invoice dates (with reference to the first check in the packet).
5. Keeping all invoices in a packet if one of the current invoices is datelike.
6. Dropping type H invoices that are not datelike where all of the current invoices are not datelike.
7. Reporting last payments compared to payment history for two point match on four character vendor name and invoice amount when some invoice dates are different and at least one invoice number is datelike while excluding invoices with check dates older than nine months.

Dup3 190 captures packets having similar invoice dates and amounts, differing on one of several flagged conditions. That is, dup3 190 captures packets for duplicate invoice analysis where the invoice was paid last night and that have identical invoice dates and identical invoice amounts when compared to invoices from the history file. Invoices are dropped if one of the flags does not apply. Referring to FIG. 5, the flags are:

Flag 1: transposed digits in invoice number 202.
Flag 2: datelike invoice number 202 for same four character vendor name 216.
Flag 3: match on invoice number 202.
Flag 4: match on invoice number 202 except for a prefix/suffix character for same four character vendor name 216.
Flag 5: lengths of invoice number 202 differ for same four character vendor name 216.
Flag 6: match on invoice numbers 202 while ignoring embedded blanks.

In accordance with an exemplary embodiment, dup3 190 executes the following steps.

1. Sorting invoices by INV_DT 214, INV_AMT 204, TYPE 226, VEN_NAM 216 and CHK_DT 210.
2. Capturing packets that have a check from last night and have identical invoice dates and amounts.
3. Marking packets with appropriate flags (Flag 1 through Flag 6, above), including:

Outputting flag conditions applicable to this packet, and Merging the flags back to the correct invoices.
4. Reporting two point match on invoice date and invoice amount where invoices in a packet (invoice paid last night compared to all other invoice numbers in packet) are flagged with at least one of Flag 1 through Flag 6.

Dup4 192 captures packets having the same invoice amount and numbers, but not the same date and vendor name. That is, it captures packets for duplicate invoice analysis where the invoice was paid last night and that have identical invoice amounts and identical invoice numbers when compared to other invoices from the last night or the history file. Packets are dropped if (the invoice dates are identical and the four character vendor names are identical.)

In accordance with an exemplary embodiment of the invention, dup4 192 executes the following steps.

1. Deleting invoices for which document type 220 is 'K' and ECR number 218 is not 'OD', or if document type 220 is 'RS'. 'K' is the first digit in a batch type payment, 'OD' are the first two digits of an electronic check request number (ECR#), and 'RS' is the document type for internal invoicing.
2. Sorting invoices in the history file by invoice amount 204, invoice number 202, type 236, and vendor name 216.
3. Deleting packets having only one invoice.
   4. Marking packets containing invoices having different invoice dates or vendor names with reference to the first check in the packet.

The test for packet creation is different for each report and this equality comparison is inherent in the definition of each packet. An invoice may appear on multiple reports.

Dup1 has identical invoice numbers and vendor numbers.
Dup2 has identical vendor names and invoice amounts.
Dup3 has identical invoice dates and invoice amounts.
Dup4 has identical invoice amounts and invoice numbers.
Dup5 has identical invoice numbers and vendor names.
Dup6 has identical invoice numbers, vendor names and invoice amounts.

5. Reporting last payments compared to payment history, a two point match on invoice amount and invoice number where vendor number and invoice date are different. Packets are dropped if (the invoice dates are identical and the four character vendor names are identical.

Referring to FIG. 1, the history file and current file are in SAS DBS 132.

Dup5 194 captures packets having the same invoice number 202 and vendor name 215, but not the same vendor number 200 and invoice amount 204. Thus, it captures packets for duplicate invoice analysis for all invoices on the history file that have identical invoice numbers and identical vendor names (first four characters). Packets are kept only if the vendor number 202 and the invoice amount 204 are different.

In accordance with an exemplary embodiment of the invention, dup5 194 executes the following steps.

1. Deleting invoices for which document type 220 is 'K' and ECR number 218 is not 'OD', or if document type 220 is 'RS'.
2. Sorting the history file by INV_NUM 202, VEN_NAM4 216, TYPE 236 and INV_AMT 204.
3. Capturing packets that have identical invoice numbers 202 and identical first four characters of the vendor name 216.

4. Flushing packets for which there is only one invoice entry.
5. Marking packets that, with reference to the first check in the packet, have different vendor numbers 216 and invoice amounts 204.
6. Reporting payment history analysis for this two point match on the four character vendor name 216 and invoice number 202 for different vendor numbers 200 and invoice amounts 204, keeping packets only if the vendor number 200 and the invoice amount 204 are different.

Dup6 196 captures packets having the same vendor number and the same invoice number and amount. That is, it captures packets for duplicate invoice analysis where the invoice was paid last night and that have identical vendor numbers 202, identical invoice numbers 202, and identical invoice amounts 204 when compared to invoices from the last night or the history file. The packet is kept when the amounts 204 are the same and the invoice dates 214 are different.

In accordance with an exemplary embodiment of the invention, dup6 196 executes the following steps.

1. Deleting invoices for which document type 220 is 'K' and ECR number 218 is not 'OD', or if document type 220 is 'RS'.
2. Sorting history file by VEN_NUM 216, INV_NUM 202, INV_AMT 204 and TYPE 236. (Note change in sort order from dup1 186.)
3. Deleting packets containing only one invoice entry.
4. Marking packets for retention that have different invoice dates 214 or amounts 204, with reference to the first check in the packet. (Note change from dup1 186, which also checks invoice amount 204 at this point.)
5. Reporting last payments compared to payment history, a two point match on vendor number and invoice number when the invoice date is different and the invoice amount is the same.

Duppay 184 maintains the duplicate invoice detection file and SAS database 132. This code reads the new and changed invoices as extracted from the BDW 118 and adds or updates records as appropriate. One update pass is made through the duplicate payment invoice detection historical data as maintained on the history SAS data base to apply the new and changed invoices from daily activity as captured on the current SAS data base.

The input file is CURRIN, the daily invoices from BDW supplied as a flat file and containing both new and updated invoices.

The output SAS database file is HISTORY, the updated invoice history file.

The following SAS database files are logically temporary, are rebuilt each day, and are used as input to the various reports dup1–dup6 180–196, respectively:

| REPORT | updated invoice history file lest the type 'X' invoices. |
|---|---|
| CURR | daily invoices. |
| NEW_INV | only the new invoices from the daily invoices. |
| DELETES | the invoices which have aged off the history file. |

These database files are included within SAS DBS 132.

In accordance with an exemplary embodiment of the invention, duppay 184 executes the following steps.

1. Resetting TYPE field 236 to 'H', 'C', or 'X', as appropriate, where:

| 'H' | (history) implies that the invoice is an old one. |
|---|---|
| 'C' | (current) implies that the invoice is a new one. |
| 'X' | implies that the invoice has been logically deleted using cancel dates other than 2222-02-02 or 2099-01-01. |

Logically deleted invoices are retained on the history SAS data base.

2. Dropping invoices from the history SAS database 132 if the check date 210 indicates the invoice is older than, say, 18 months.

Duppay 184 logic for applying new and changed invoices captured in the current SAS database to the history file executes the following steps.

3. For daily activity invoices, setting the variable DATE-LIKE 234 to 'Y' when the invoice number 200 is datelike, else setting it to 'N'.
4. Calculating the invoice length INV_LEN variable 232 for daily activity invoices.
5. Updating an existing invoice on the history database from current CURR if there is a match on SYSTEM 228 (i.e., region) and INV_ID 206 as found on the history and current databases.
6. Adding an invoice to the history database if there is not a match on SYSTEM and INV_ID 206.

After the updates have been applied to the history file, the following logic is performed.

7. Setting type 236 to 'X' for invoices with cancel date CANCELDT 226 not set to '2099-01-01' or '2222-02-22' to indicate that these are canceled invoices that are not active and therefore should not be considered in the various duplicate invoice reports.
8. Removing from the history file invoices that are older than 18 months, as indicated by check date CHK_DT 210.

Duprep 180 generates reconciliation reports 128 for the duplicate invoice payment system. This code summarizes the count and amount for the following invoice classes:

(1) daily activity invoices
(2) daily activity invoices that are new
(3) invoices that have aged off the HISTORY data base
(4) invoices that are on the HISTORY data base The input SAS database files are:

HISTORY

Input SAS data base Files: The following SAS data bases are logically temporary and are rebuilt each day. They are used as input to the various reports.

| REPORT | updated invoice history file less the type X invoices. This is used by the daily dup invoice report programs report1 through 6 |
|---|---|
| CURR | Daily activity file |
| NEW_INV | Daily activity file with only the new invoices |
| DELETES | Invoices removed from HISTORY. |

The reconciliation Report 128 types are:

| SAS data base used | Title |
|---|---|
| IBMAP.CURR | Daily Summary Reconciliation |
| IBMAP.NEW_INV | Daily New Invoice Reconciliation |
| IBMAP.DELETES | Daily Deletion Reconciliation |
| IBMAP.HISTORY | Historical Data Base Summary |

In accordance with an exemplary embodiment of the invention, duprep 180 executes the following steps.

1. Sorting invoices by COUNTRY 224, SYSTEM 228, Type 236.
2. Outputting daily summary reconciliation, daily new invoice reconciliation, daily deletion reconciliation, and historical database summary report.

Dupstart 182 does the initial load for the duplicate payment invoice detection file. This code reads the invoice history as extracted from the BWD 118, which is a one time run intended for startup or reinitialization purposes.

In accordance with an exemplary embodiment of the invention, dupstart 182 executes the following steps for all invoices.

1. Setting the variable DATELIKE 234 to 'Y' when the invoice number 202 is datelike, else setting it to 'N'.
2. Setting the type field 236 to 'H'.

The input is a complete invoice history file, and the output is the SAS updated invoice history database file HISTORY.

Referring to FIG. 5, a duplicate report matrix illustrates the invoices selected for output for each of the reports dup1 through dup6. In FIG. 5, an 'X' signifies the selection of those invoices which compare equal on the applicable criteria 216, 200, 202, 214, and 204, respectively. An 'O' signifies the selection of those invoices which do not compare equal. Every flag except for dup3 match on the first four characters of the vendor name. Dup1 requires that either the date or the amount needs to be different.

Advantages Over the Prior Art

It is an advantage of the invention that there is provided an improved method and system for identifying duplicate invoices prior to payment.

It is an advantage of the invention that there is provided a system and method for identifying prior to payment duplicate invoices from activity on multiple systems.

It is an advantage of the invention that there is provided a system and method periodically executing a plurality of coordinated logic processes comparing current activity against historical activity from a plurality of systems for identifying duplicate invoices prior to payment.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the preferred embodiment of the invention has been described with respect to identifying invoice records, other types of records may be similarly processed. Consequently, the term "invoice" is intended to encompass other types of records, such as those documenting requests made of an enterprise for payment, credit, goods, services, and so forth.

Accordingly, the scope of protection of this invention is limited only by the following claims and their equivalents.

We claim:

1. A method for processing index numbers of accounts payable records from a plurality of accounts payable systems to identify duplicate records, comprising the steps of:
   loading first records having an index number into a database from a plurality of accounts payable systems during a first predetermined time period;
   for each record having said index number, searching said database for another record, loaded during a second earlier time period, having the same index number and replacing said another record, if found, with said first record;
   comparing each first record for which no matching index number record was found with all other first records for which no matching index number record was found;
   comparing each of said first records for which no matching index number record was found with all the other records including the replaced records in said database;
   generating reports of the comparing steps, the reports listing records which compared; and
   eliminating from said database said first records deemed to have compared.

2. The method of claim 1, said records being invoice records.

3. A method for providing a report that can be used to evaluate two or more invoiced documents for further investigation of possible dulicate invoicing, comprising the steps of:
   maintaining a compact database by entering invoice data to said compact database from a plurality of accounts payable systems for payment at a later date and removing canceled invoice documents and invoice documents older than a predetermined period;
   responsive to submission of an invoice with a null invoice indicia field entering date indicia in said null invoice indicia field;
   extracting data from said compact database by matching on supliers invoice indicia, name, date and amount;
   checking said compact database for duplicate invoices before said later date; and
   producing said report from said data.

4. A method for capturing packets of possible duplicate invoices for duplicate invoice analysis, comprising the steps of:
   preparing a set of invoices including all invoices from all of a plurality of accounts payable systems for different entities within an enterprise;

removing selected invoices from said set of invoices based upon first expert criteria to form an investigative packet;

maintaining as a first subset of said investigative packet a collection of current invoices that have not yet been paid;

maintaining as a second subset of said investigative packet a collection of history invoices that have been paid;

generating based on second expert criteria from said current invoices and said history invoices a plurality of intermediate packets of invoices exhibiting a same behavior, each said intermediate packet including at least one invoice from said collection of current invoices;

dropping packets from said plurality of intermediate packets based on third expert criteria;

flagging invoices in remaining intermediate packets based on fourth expert criteria;

dropping from said remaining intermediate packets to form a final set of packets invoices which have not been flagged; and generating from said final set of packets a first report of invoices having same invoice numbers and vendor numbers, a second report of invoices having similar vendor names and same invoice amounts; a third report of invoices having similar invoice dates and invoice amounts differing only on flagged conditions; a fourth report of invoices having same invoice amounts and invoice numbers but not same date and vendor name; a fifth report of invoices having same invoice numbers and vendor names but not same vendor number and invoice amount; and a sixth report of invoices having same invoice numbers, vendor name and invoice amounts, irrespective of invoice date.

5. The method of claim 4, each invoice comprising a record including vendor identifier indicia, vendor record indicia, date indicia, and amount indicia.

6. The method of claim 5, each said record including a vendor record indicia field, a data indicia field, and an amount indicia field.

7. The method of claim 6, further comprising the steps of:
flagging said invoices in said packet against each other with respect to expert criteria;
dropping from said packet unflagged invoices; and
discarding remaining packets having no current invoices.

8. The method of claim 7, further comprising the step of flagging record pairs having transposed digits in said vendor record indicia fields.

9. The method of claim 7, further comprising the step responsive to receiving an invoice with null vendor record indicia field of entering date indicia as date-like indicia to said vendor record indicia field.

10. The method of claim 9, further comprising the step of flagging invoice pairs having a same vendor identifier indicia and date-like indicia in said vendor indicia field.

11. The method of claim 7, further comprising the step of flagging invoice pairs having matching vendor record indicia.

12. The method of claim 7, further comprising the step of flagging invoice pairs having, for matching vendor identification indicia, matching vendor record indicia except for a prefix or suffix character.

13. The method of claim 7, further comprising the step of flagging invoice pairs, for matching vendor identification indicia, having vendor record indicia of different lengths.

14. The method of claim 7, further comprising the step of flagging invoice pairs matching on said vendor record indicia while ignoring embedded blanks.

15. The method of claim 9, further comprising the steps of:
flagging invoice pairs having transposed digits in said vendor record indicia fields;
flagging invoice pairs having a same vendor identifier indicia and date-like indicia in said vendor indicia field;
flagging invoice pairs having matching vendor record indicia;
flagging invoice pairs having, for matching vendor identification indicia, matching vendor record indicia except for a prefix or suffix character;
flagging invoice pairs, for matching vendor identification indicia, having vendor record indicia of different lengths; and
flagging invoice pairs matching on said vendor record indicia while ignoring embedded blanks.

16. The method of claim 4, further comprising the step of forcing all said invoices to be current.

17. The method of claim 4, further comprising the step of capturing packets having same vendor and invoice numbers.

18. The method of claim 4, further comprising the step of capturing packets having similar vendor names and same invoice amount.

19. The method of claim 4, further comprising the step of capturing packets having similar invoice dates and amounts, differing only on flagged conditions.

20. The method of claim 4, further comprising the step of capturing packets having same invoice amount and numbers but not same date and vendor name.

21. The method of claim 4, further comprising the step of capturing packets having same invoice number and vendor name but not same vendor number and invoice amount.

22. The method of claim 4, further comprising the step of capturing packets having the same vendor number and same invoice number and amount, irrespective of invoice date.

23. A program storage device readable by a machine, tangibly embodying a program of instructions executable by a machine to perform method steps for processing index numbers of accounts payable records from a plurality of accounts payable systems to identify duplicate records, said method steps comprising:

loading first records having an index number into a database during a first predetermined time period;

for each record having said index number, searching said database for another record, loaded during a second earlier time period, having the same index number and replacing said another record, if found, with said first record;

comparing each first record for which no matching index number record was found with all other first records for which no matching index number invoice was found;

comparing each of said first invoices for which no matching index number record was found with all the other records including the replaced records in said database;

generating reports of the comparing steps, the reports listing records which compared; and eliminating from said database said first records deemed to have compared.

24. A program storage device readable by a machine, tangibly embodying a program of instructions executable by a machine to perform method steps for providing a report that can be used to evaluate two or more invoiced documents for further investigation of possible duplicate invoicing, said method steps comprising:

maintaining a compact database by removing canceled invoice documents and invoice documents older than a predetermined period;

responsive to submission of an invoice with a null invoice indicia field entering date indicia in said null invoice indicia field;

extracting data from said compact database by matching on suppliers invoice indicia, name, date and amount; and producing said report from said data.

25. A program storage device readable by a machine, tangibly embodying a program of instructions executable by a machine to perform method steps for capturing packets of possible duplicate invoices for duplicate invoice analysis, said method steps comprising:

preparing a set of invoices including all invoices from all of a plurality of accounts payable systems for different entities within an enterprise;

removing selected invoices from said set of invoices based upon first expert criteria to form an investigative packet;

maintaining as a first subset of said investigative packet a collection of current invoices that have not yet been paid;

maintaining as a second subset of said investigative packet a collection of history invoices that have been paid;

generating based on second expert criteria from said current invoices and said history invoices a plurality of intermediate packets of invoices exhibiting a same behavior, each said intermediate packet including at least one invoice from said collection of current invoices;

dropping packets from said plurality of intermediate packets based on third expert criteria;

flagging invoices in remaining intermediate packets based on fourth expert criteria; and dropping from said remaining intermediate packets to form a final set of packets invoices which have not been flagged.

26. A system for capturing packets of possible duplicate invoices for duplicate invoice analysis, comprising:

a set of invoices including all invoices from all of a plurality of accounts payable systems of an enterprise;

an investigative packet formed by removing selected invoices from said set of invoices based upon first expert criteria;

a first subset of said investigative packet including a current file of invoices that have not yet been paid;

a second subset of said investigative packet including a history file of invoices that have been paid; and a plurality of intermediate packets of invoices generated based on second expert criteria from said first and second subsets for storing invoices exhibiting a same behavior, said packet including at least one invoice from said current file; and a plurality of reports generated from a plurality of said packets including a first report of invoices having same invoice numbers and vendor numbers, a second report of invoices having similar vendor names and same invoice amounts; a third report of invoices having similar invoice dates and invoice amounts differing only on flagged conditions; a fourth report of invoices having same invoice amounts and invoice numbers but not same date and vendor name; a fifth report of invoices having same invoice numbers and vendor names but not same vendor number and invoice amount; and a sixth report of invoices having same invoice numbers, vendor name and invoice amounts, irrespective of invoice date.

27. The system of claim 26, said packet containing invoices having same vendor and invoice numbers.

28. The system of claim 26, said packet containing invoices having similar vendor names and same invoice amount.

29. The system of claim 26, said packet containing invoices having similar invoice dates and amounts, differing only on flagged conditions.

30. The system of claim 26, said packet containing invoices having same invoice amount and numbers but not same date and vendor name.

31. The system of claim 26, said packet containing invoices having same invoice number and vendor name but not same vendor number and invoice amount.

32. The system of claim 26, said packet containing invoices having the same vendor number and same invoice number and amount, irrespective of invoice date.

33. A computer program product or computer program element for processing index numbers of accounts payable records from a plurality of accounts payable systems to identify duplicate records according to method steps comprising:

loading first records having an index number into a database during a first predetermined time period;

for each record having said index number, searching said database for another record, loaded during a second earlier time period, having the same index number and replacing said another record, if found, with said first record;

comparing each first record for which no matching index number record was found with all other first records for which no matching index number invoice was found;

comparing each of said first invoices for which no matching index number record was found with all the other records including the replaced records in said database;

generating reports of the comparing steps, the reports listing records which compared; and eliminating from said database said first records deemed to have compared.

34. A computer program product or computer program element for capturing packets of possible duplicate invoices for duplicate invoice analysis according to method steps comprising:

preparing a set of invoices including all invoices from all of a plurality of accounts payable systems for different entities within an enterprise;

removing selected invoices from said set of invoices based upon first expert criteria to form an investigative packet;

maintaining as a first subset of said investigative packet a collection of current invoices that have not yet been paid;

maintaining as a second subset of said investigative packet a collection of history invoices that have been paid;

generating based on second expert criteria from said current invoices and said history invoices a plurality of intermediate packets of invoices exhibiting a same behavior, each said intermediate packet including at least one invoice from said collection of current invoices;

dropping packets from said plurality of intermediate packets based on third expert criteria;

flagging invoices in remaining intermediate packets based on fourth expert criteria; and dropping invoices which have not been flagged from said remaining intermediate packets to form a final set of packets.

* * * * *